(12) United States Patent
Ma et al.

(10) Patent No.: US 12,299,269 B2
(45) Date of Patent: May 13, 2025

(54) SPECIAL EFFECT PROCESSING METHOD AND APPARATUS

(71) Applicant: Beijing Bytedance Network Technology Co., Ltd., Beijing (CN)

(72) Inventors: Ruifeng Ma, Beijing (CN); Le Gao, Beijing (CN); Yantong Wei, Beijing (CN); Haozhe Li, Beijing (CN); Di Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/886,377

(22) Filed: Aug. 11, 2022

(65) Prior Publication Data

US 2022/0391082 A1 Dec. 8, 2022

Related U.S. Application Data

(63) Continuation of application No. PCT/CN2021/080308, filed on Mar. 11, 2021.

(30) Foreign Application Priority Data

Mar. 23, 2020 (CN) .......................... 202010207490.8

(51) Int. Cl.
*G06F 3/04847* (2022.01)
*G06F 3/0482* (2013.01)
*G06F 9/451* (2018.01)

(52) U.S. Cl.
CPC ........ *G06F 3/04847* (2013.01); *G06F 3/0482* (2013.01); *G06F 9/451* (2018.02)

(58) Field of Classification Search
CPC ..... G06F 3/0482; G06F 3/04847; G06F 9/451
See application file for complete search history.

(56) References Cited

U.S. PATENT DOCUMENTS 5,999,173 A * 12/1999 Ubillos ................ G11B 27/034
6,542,692 B1 * 4/2003 Houskeeper ......... G11B 27/034
386/280

(Continued)

FOREIGN PATENT DOCUMENTS

CN 101814006 A 8/2010
CN 106341720 A 1/2017

(Continued)

OTHER PUBLICATIONS

English Machine Translation of CN 106341720A (original provided via IDS on Aug. 11, 2022). Translation provided by Proquest LLC, Dialogsolutions. Translated on Feb. 14, 2023. (Year: 2019).*

(Continued)

*Primary Examiner* — Eric J. Bycer
(74) *Attorney, Agent, or Firm* — Astute IP Law Group

(57) ABSTRACT

A special effect processing method, an apparatus, an electronic device and a computer readable storage medium. Where the method includes: displaying (S11) a special effect behavior window in response to a special effect adding operation of a special effect configuration window, where the special effect behavior window includes a special effect adding button and a trigger adding button; adding (S12) at least one special effect object in the special effect behavior window in response to the special effect adding operation of the special effect adding button; setting (S13) at least one triggering operation for a special effect behavior corresponding to the special effect behavior window in response to a trigger adding operation of the trigger adding button, where the at least one triggering operation is used to trigger the special effect behavior to be displayed; and generating (S14) a special effect event according to the special effect behavior.

9 Claims, 9 Drawing Sheets

(56) References Cited

U.S. PATENT DOCUMENTS

| | | | |
|---|---|---|---|
| 6,546,188 B1* | 4/2003 | Ishii | G11B 27/34 386/280 |
| 8,046,356 B2* | 10/2011 | Schultz | G06F 16/958 379/88.19 |
| 9,773,524 B1* | 9/2017 | Oh | G11B 27/34 |
| 2001/0004417 A1* | 6/2001 | Narutoshi | G11B 27/031 386/290 |
| 2003/0002851 A1* | 1/2003 | Hsiao | G11B 27/034 386/280 |
| 2005/0281535 A1* | 12/2005 | Fu | G06F 16/785 |
| 2006/0092295 A1* | 5/2006 | Mercer | G11B 27/034 |
| 2006/0115185 A1* | 6/2006 | Lida | H04N 5/2628 |
| 2007/0189709 A1* | 8/2007 | Ageishi | G11B 27/34 386/280 |
| 2009/0299981 A1* | 12/2009 | Nagasaka | G11B 27/322 |
| 2010/0293190 A1* | 11/2010 | Kaiser | H04N 21/854 707/769 |
| 2012/0210217 A1* | 8/2012 | Abbas | G11B 27/00 715/716 |
| 2012/0210262 A1* | 8/2012 | Sheeler | G06T 13/20 715/765 |
| 2012/0262483 A1* | 10/2012 | Kim | G09G 5/14 345/629 |
| 2012/0284622 A1* | 11/2012 | Avery | G11B 27/11 715/719 |
| 2013/0097552 A1* | 4/2013 | Villaron | G06T 13/80 715/781 |
| 2013/0239056 A1* | 9/2013 | Ubillos | G06F 3/04845 715/833 |
| 2013/0342708 A1 | 12/2013 | Chou et al. | |
| 2014/0003795 A1* | 1/2014 | Meehan | G11B 27/034 386/280 |
| 2014/0096002 A1* | 4/2014 | Dey | G06F 3/04817 715/723 |
| 2015/0135124 A1 | 5/2015 | Wang et al. | |
| 2015/0234464 A1 | 8/2015 | Yliaho | |
| 2015/0318020 A1* | 11/2015 | Pribula | H04N 21/2743 386/290 |
| 2016/0260239 A1* | 9/2016 | Lee | G06F 3/0485 |
| 2016/0295272 A1* | 10/2016 | Li | H04N 21/8545 |
| 2017/0329465 A1 | 11/2017 | Hong | |
| 2017/0357417 A1 | 12/2017 | Goossens et al. | |
| 2018/0300037 A1* | 10/2018 | Takeda | G06F 13/00 |
| 2019/0116323 A1* | 4/2019 | Kim | H04N 5/2621 |
| 2019/0342507 A1* | 11/2019 | Dye | G06T 13/40 |
| 2020/0327641 A1 | 10/2020 | Xu | |
| 2021/0366163 A1* | 11/2021 | Lin | G06T 11/60 |

FOREIGN PATENT DOCUMENTS

| | | |
|---|---|---|
| CN | 107071580 A | 8/2017 |
| CN | 108280883 A | 7/2018 |
| CN | 108810597 A | 11/2018 |
| CN | 108958610 A | 12/2018 |
| CN | 110225246 A | 9/2019 |
| CN | 110393913 A | 11/2019 |
| CN | 110599396 A | 12/2019 |
| CN | 110674341 A | 1/2020 |
| EP | 2511901 A2 | 10/2012 |
| JP | 2003114678 A | 4/2003 |
| JP | 2006146428 A | 6/2006 |
| JP | 2019075124 A | 5/2019 |
| JP | 2019197519 A | 11/2019 |
| JP | 2021508882 A | 3/2021 |
| KR | 1020120117578 A | 10/2012 |
| WO | 2017077751 A1 | 5/2017 |
| WO | 2019154337 A1 | 8/2019 |

OTHER PUBLICATIONS

International Search Report issued in corresponding International Application No. PCT/CN2021/080308 dated Jun. 10, 2021.
Chinese Office Action in corresponding Chinese Application No. CN202010207490.8 dated Dec. 16, 2022.
"How does the Effect Creator for Mac make filters?," MacZ, Jun. 2019. Retrieved from the Internet: <URL:https://www.macz.com/news/2178.html>, 6 pages.
"How to make Tiktok special effects video? Effect Creator for Mac version and reference case," MacZ, Jun. 2019. Retrieved from the Internet: <URL:https://www.macz.com/news/2170.com>, 12 pages.
"Short video how to make facial makeup? Effect Creator for mac beauty making teaching," MacZ, Jun. 2019. Retrieved from the Internet: <URL:https://www.macz.com/news/2181.html>, 6 pages.
Office Action in CN202010207490.8, mailed Apr. 21, 2023, 11 pages.
Extended European Search Report in EP21775222.9, mailed Jul. 31, 2023, 10 pages.
Office Action in JP2022558033, mailed Nov. 28, 2023, 5 pages.
Office Action for Korean Patent Application No. 10-2022-7033445, mailed on Jul. 22, 2024, 13 pages.
Invitation to Respond to Written Opinion for Singaporean Application No. 11202253435U mailed on Mar. 13, 2025, 12 pages.

* cited by examiner

FIG. 1d

| Trigger type |
|---|
| Algorithm trigger (expression trigger, gesture trigger) |
| Input trigger (clicking on a screen, or sliding a screen) |
| Business logic trigger (starting shooting) |
| Control trigger (playing preset duration trigger, timer trigger) |
| Notification message trigger |

FIG. 1e

SPECIAL EFFECT PROCESSING METHOD AND APPARATUS

CROSS-REFERENCE TO RELATED APPLICATION

This application is a continuation of International Application No. PCT/CN2021/080308, filed on Mar. 11, 2021, which claims priority to Chinese Patent Application No. 202010207490.8, filed to the China National Intellectual Property Administration on Mar. 23, 2020, and entitled "Special Effect Processing Method and Apparatus". The disclosures of the aforementioned applications are hereby incorporated by reference in their entireties.

TECHNICAL FIELD

The present disclosure relates to the technical field of image special effect processing, and in particular, to a special effect processing method, an apparatus and a computer readable storage medium.

BACKGROUND

With the development of intelligent terminal technology, functions of an intelligent terminal are becoming more and more diversified. For example, a user may capture an image (e.g., a photo or a video) using a camera in a terminal, which has become a new mode of entertainment for people. However, simply capturing the image can no longer meet the needs of the user. Then, how to perform special effect processing on the captured image to get a more interesting image becomes the focus of people's attention.

When making special effects in the prior art, one trigger operation usually can only trigger one special effect object. For example, if a special effect xx is implemented, an idea of using a timeline is [the special effect xx->the special effect xx plays 3s->triggering the special effect xx], that is, the special effect and the special effect triggering event are bound one by one, and the scalability is insufficient.

SUMMARY

This Summary section is provided to introduce concepts in a simplified form, which will be described in detail in the Description of Embodiments section that follows. This Summary section is not intended to identify key features or essential features of the claimed technical solution, and not intended to be used to limit the scope of the claimed technical solution either.

The technical problem solved by the present disclosure is to provide a special effect processing method to at least partially solve the technical problem of insufficient scalability of the special effect processing in the prior art. In addition, a special effect processing apparatus, a special effect processing hardware apparatus, a computer readable storage medium and a special effect processing terminal are also provided.

In order to achieve the above object, according to an aspect of the present disclosure, the following technical solution is provided.

A special effect processing method includes:

displaying a special effect behavior window in response to a special effect adding operation of a special effect configuration window; where the special effect behavior window includes a special effect adding button and a trigger adding button;

adding at least one special effect object in the special effect behavior window in response to the special effect adding operation of the special effect adding button;

setting at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window; and generating a special effect event according to the special effect behavior.

In order to achieve the above object, according to an aspect of the present disclosure, the following technical solution is provided.

A special effect processing apparatus includes:

a special effect behavior window display module, configured to display a special effect behavior window in response to a special effect adding operation of a special effect configuration window; where the special effect behavior window includes a special effect adding button and a trigger adding button;

a special effect adding module, configured to add at least one special effect object in the special effect behavior window in response to the special effect adding operation of the special effect adding button;

a trigger adding module, configured to set at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window; and a special effect event generating module, configured to generate a special effect event according to the special effect behavior.

In order to achieve the above object, according to an aspect of the present disclosure, the following technical solution is provided.

An electronic device includes:

a memory, configured to store non-transitory computer readable instructions; and a processor, configured to run the computer readable instructions, so that the processor, when performed, implements the special effect processing method of the above aspect.

In order to achieve the above object, according to an aspect of the present disclosure, the following technical solutions are provided.

A computer readable storage medium is used to store non-transitory computer readable instructions which, when executed by a computer, enable the computer to perform the special effect processing method of the above aspect.

A computer program product includes computer program instructions enabling a computer to perform the special effect processing method of the above aspect.

A computer program, when running on a computer, enables the computer to perform the special effect processing method of the above aspect.

In order to achieve the above object, according to another aspect of the present disclosure, the following technical solution is provided.

A special effect processing terminal includes the above special effect processing apparatus.

The embodiments of the present disclosure display the special effect behavior window in response to the special effect adding operation of the special effect configuration window; add at least one special effect object in the special effect behavior window in response to the special effect adding operation of the special effect adding button of the special effect behavior window; set at least one triggering operation for the special effect behavior corresponding to the special effect behavior window in response to the trigger adding operation of the trigger adding button; and generate a special effect event according to the special effect behavior. The display of at least one special effect object in the special effect behavior may be triggered by configuring the at least one triggering operation above, which causes good expandability.

The above description is only an overview of the technical solutions of the present disclosure, in order to understand the technical means of the present disclosure more clearly, it may be implemented according to contents of the description, and in order to make the above and other purposes, features and advantages of the present disclosure more apparent and easy to understand, preferred embodiments are exemplified below, and are described in detail as follows in conjunction with the drawings.

BRIEF DESCRIPTION OF DRAWINGS

The above and other features, advantages and aspects of the embodiments of the present disclosure will become more apparent in conjunction with the accompanying drawings and with reference to the following detailed implementations. Throughout the drawings, the same or similar reference numbers refer to the same or similar elements. It should be understood that the drawings are schematic and that the devices and elements are not necessarily drawn to scale.

FIG. 1d is a schematic diagram of setting of special effect parameters in a special effect processing method according to an embodiment of the present disclosure;

FIG. 1e is a schematic diagram of trigger types in a special effect processing method according to an embodiment of the present disclosure.

DESCRIPTION OF EMBODIMENTS

Figure 1A:
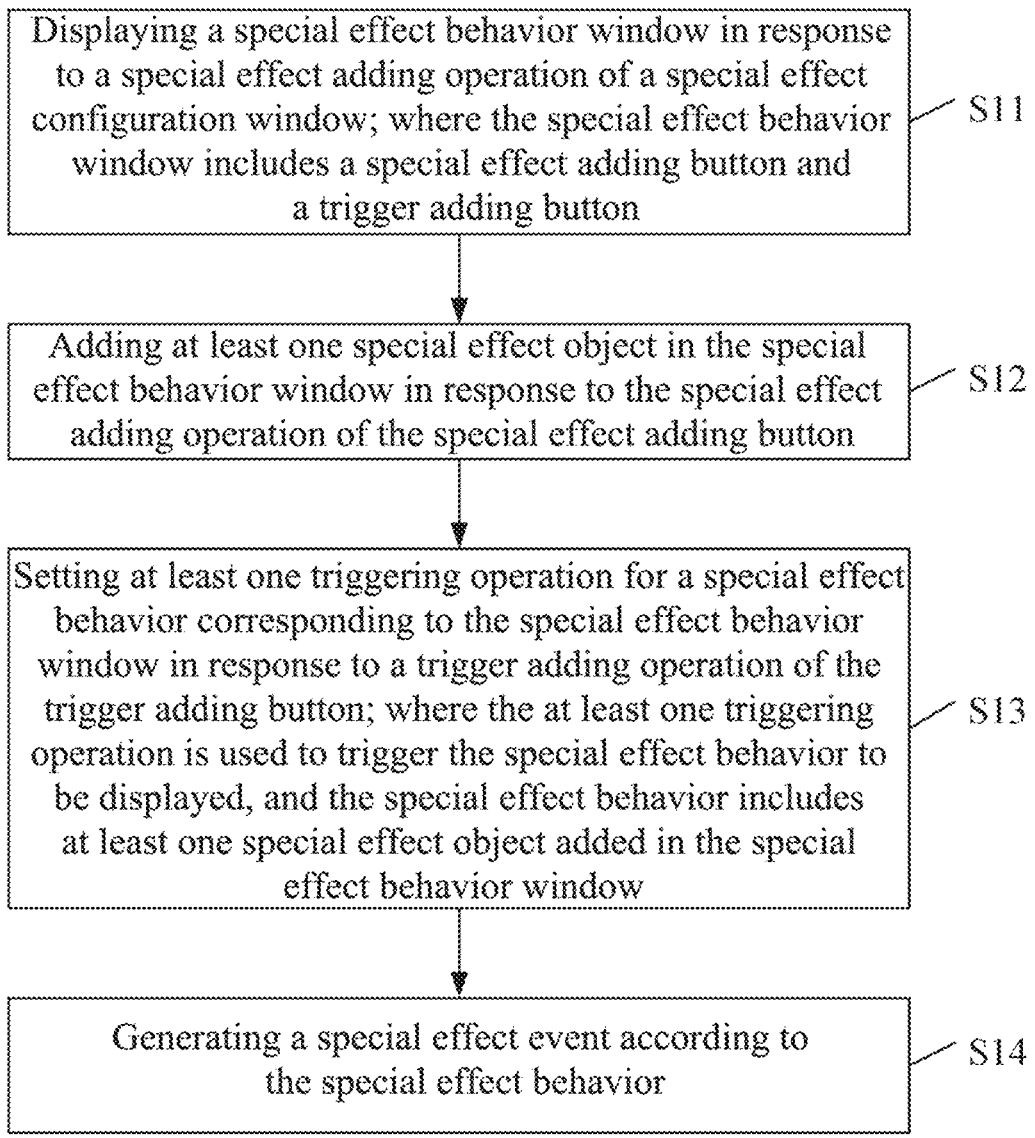
FIG. 1a is a schematic flowchart of a special effect processing method according to an embodiment of the present disclosure.

Embodiments of the present disclosure will be described in more detail below with reference to the drawings. While certain embodiments of the present disclosure are shown in the drawings, it should be understood that the present disclosure may be embodied in various forms and should not be interpreted as being limited to the embodiments set forth herein, rather, these embodiments are provided for the purpose of a more thorough and complete understanding of the present disclosure. It should be understood that the drawings and the embodiments of the present disclosure are only for exemplary purposes, and are not used to limit the protection scope of the present disclosure.

It should be understood that the respective steps described in method embodiments of the present disclosure may be performed in a different order, or performed in parallel. Further, the method embodiments may include additional steps or omit performing the illustrated steps. The scope of the present disclosure is not limited in this regard.

The term "including" and variations thereof used herein are open-ended inclusions, that is, "including but not limited to". The term "based on" means "at least partially based on"; the term "an embodiment" means "at least one embodiment"; the term "another embodiment" means "at least one of other embodiments"; and the term "some embodiments" means "at least some embodiments". Relevant definitions of other tennis will be given in the description below.

Embodiment 1

In order to solve the technical problem of the insufficient scalability of special effect processing in the prior art, an embodiment of the present disclosure provide a special effect processing method. As shown in FIG. 1a, the special effect processing method mainly includes the following steps S11 to S14.

Step S11: displaying a special effect behavior window in response to a special effect adding operation of a special effect configuration window; where the special effect behavior window includes a special effect adding button and a trigger adding button.

The special effect configuration window is a special effect processing main window, and may be specifically a card-type window. The special effect configuration window includes a special effect configuration button, and the special effect behavior window is displayed by triggering the special effect configuration button by a user. The special effect behavior window is a sub-window of the special effect configuration window, and may be specifically a card-type window.

Figure 1B:
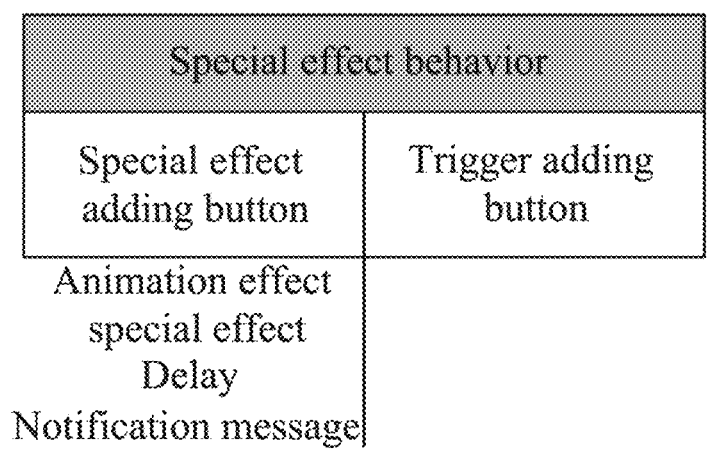
FIG. 1b is a schematic diagram of a special effect behavior window in a special effect processing method according to an embodiment of the present disclosure.

As shown in FIG. 1b, the special effect behavior window includes a special effect adding button and a trigger adding button, and the special effect adding button is used to add a special effect object and/or control delay play of a special effect event and/or send a notification message to other special effect events in series with the special effect event, and the special effect object may be an animation effect special effect, a sticker special effect, or a filter special effect. The trigger adding button is used to add a triggering operation, and the triggering operation is used to trigger the display of the above-added special effect object.

Figure 1C:
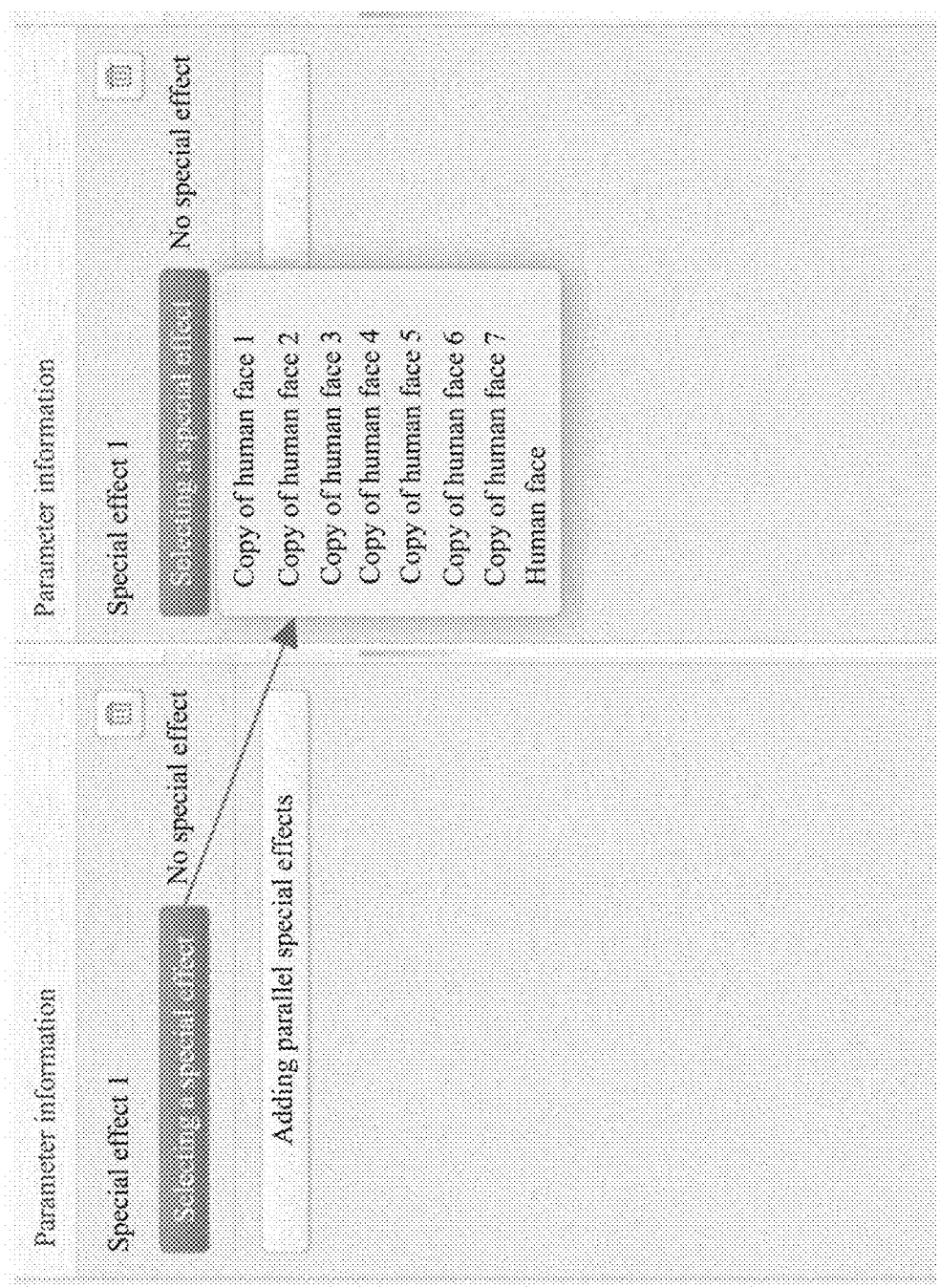
FIG. 1c is a schematic diagram of adding of a special effect in a special effect processing method according to an embodiment of the present disclosure.
Figure 1D:
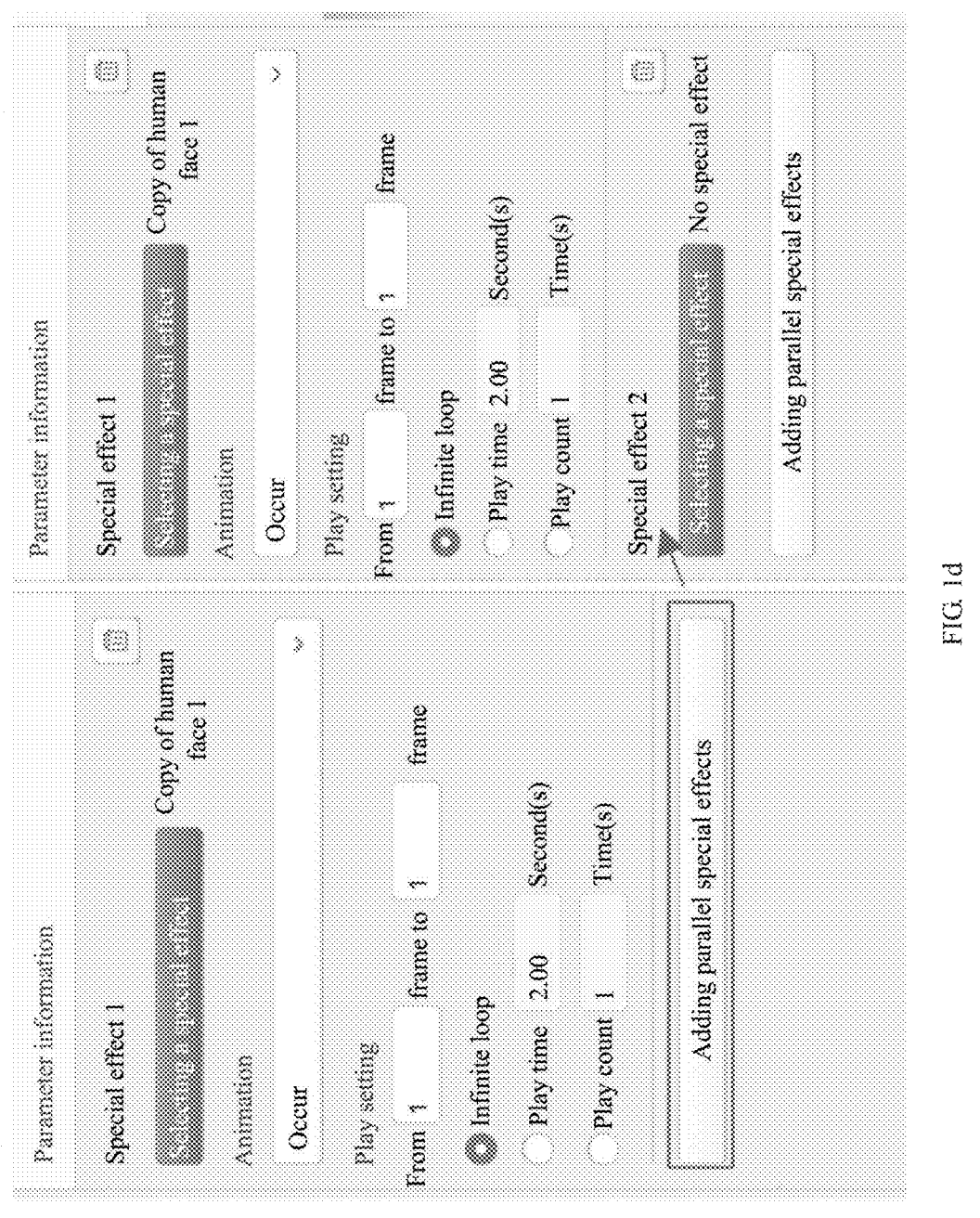

The animation effect special effect may be a special effect designed in a design panel of Effect Creator. Specifically, the animation effect special effect is added as shown in FIG. 1c, and first, a special effect object, such as face stickers, is displayed in response to a triggering operation of selecting a special effect button in a parameter information window. Extended attributes supported by each special effect are different, and related variables may be set in play attributes that appear later, as shown in FIG. 1d, including delay and play attributes. Moreover, it may continue to add a new animation effect special effect in the parameter information window, and all the special effects in the parameter information window may be played at the same time when triggered.

Step S12: adding at least one special effect object in the special effect behavior window in response to the special effect adding operation of the special effect adding button.

The user may add one or more special effect objects as required. Specifically, each time the user triggers the special effect adding button, a special effect object is added in the special effect behavior window, that is, one special effect object is obtained every time the special effect adding button performs the special effect adding operation. When multiple special effect objects are added, the special effect adding button needs to perform multiple special effect adding operations. In order to reduce the number of operations of the user and facilitate the operations of the user, the user may trigger the special effect adding button once to obtain at least one special effect object, that is, the special effect adding button may obtain at least one special effect object by performing a special effect adding operation once. When multiple special effect objects are obtained, the user only needs to trigger the special effect adding button once, which may greatly improve the efficiency of adding the special effect objects.

Step S13: setting at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window.

A special effect behavior window may be a special effect behavior card, and a special effect behavior card corresponds to a special effect behavior, that is, one or more special effect objects added in the special effect behavior card and at least one triggering operation set are combined together to form a whole special effect behavior, attributes may be set by taking the special effect behavior as a whole, for example, setting a triggering condition and a play attribute and so on, see the relevant description of the following optional embodiments for detail.

Specifically, the user may add a triggering operation as required. Specifically, one triggering operation is obtained each time the user triggers the trigger adding button, that is, the trigger adding button performs the trigger adding operation once, one triggering operation may be obtained, and when multiple triggering operations are added, the trigger adding button is required to perform multiple trigger adding operations. In order to reduce the number of the operations of the user and facilitate the operations of the user, the user may trigger the trigger adding button once to obtain at least one triggering operation, that is, the trigger adding button performs one trigger adding operation once, and the at least one triggering operation may be obtained. When multiple triggering operations are obtained, the user only needs to trigger the trigger adding button once, which may greatly improve the efficiency of adding triggering operations.

Any one of the at least one triggering operation may be used to trigger the display of at least one special effect object in the special effect behavior; or a combination of any triggering operations in the multiple triggering operations is used to trigger the display of at least one special effect object of the special effect behavior.

Step S14: generating a special effect event according to the special effect behavior.

Specifically, a script corresponding to the special effect event may be generated according to a preset format (for example, effect_sdk), as dynamic control contents of a special effect package.

The present embodiment displays the special effect behavior window in response to the special effect adding operation of the special effect configuration window; adds at least one special effect object in the special effect behavior window in response to the special effect adding operation of the special effect adding button of the special effect behavior window; sets at least one triggering operation for the special effect behavior corresponding to the special effect behavior window in response to the trigger adding operation of the trigger adding button; and generates a special effect event according to the special effect behavior. The display of at least one special effect object in the special effect behavior may be triggered by configuring the at least one triggering operation above, which causes good expandability.

In an optional embodiment, step S13 specifically includes the following steps.

The first step: displaying a trigger type setting window in response to the triggering operation of the trigger adding button.

The trigger type setting window may specifically be a card-type window. The trigger type may be selected on the trigger type setting window, and as shown in FIG. 1e, optional trigger types include an algorithm trigger (for example, an expression trigger or a gesture trigger), an input trigger (for example, clicking on a screen, or sliding the screen), a business logic trigger (for example, starting shooting), a control trigger (for example, a play preset duration trigger, a timer trigger) and a notification message trigger, etc.

The second step: obtaining a selected trigger type in response to a selection operation of a trigger type option on the trigger type setting window.

Specifically, the user may select the trigger type according to his/her own needs. For example, it may be an algorithm trigger.

The third step: adding at least one triggering operation for the special effect behavior corresponding to the special effect behavior window in response to at least one trigger adding operation corresponding to the selected trigger type on the trigger adding button.

For example, if the trigger type selected by the user is an algorithm trigger, an expression trigger and/or a gesture trigger may be further selected as the triggering operation.

In an optional embodiment, the method further includes the following steps.

The fifth step: setting a triggering condition for the special effect behavior corresponding to the special effect behavior window in response to a setting operation of a trigger setting option on a trigger setting window; where the at least one triggering operation triggers the special effect behavior to be displayed when the triggering condition is satisfied.

The trigger setting window may specifically be a card-type window, and the trigger setting window may be the same window as the trigger type setting window, both of which are windows generated in response to the triggering operation of the trigger adding button.

The triggering condition may be simultaneously triggering the at least one special effect triggering operation, triggering a combination of any special effect triggering operation of the at least one special effect triggering operation, or triggering any triggering operation triggering of the at least one special effect triggering operation.

In an optional embodiment, the fifth step specifically includes: setting a delay time for the special effect behavior corresponding to the special effect behavior window in response to a setting operation of a delay setting option on a delay setting window, and taking the delay time as the triggering condition.

The delay setting window may specifically be a card-type window, and may be a window generated by the trigger of the special effect adding button, and the user may set the delay time on the delay setting window. After the delay is set, the special effect event may be played after the delay time. Or, if there are other following special effect events, the following subsequent special effect events may only be played after the delay time.

In an optional embodiment, the fifth step specifically includes: generating a notification message of the special effect behavior corresponding to the special effect behavior window in response to a setting operation of a notification setting option on a notification setting window and taking the notification message as the triggering condition; where the notification message is used to notify display of the special effect behavior in other effect events in series with the special effect event.

The notification setting window may specifically be a card-type window, and may be a window generated by the trigger of the special effect adding button.

Figure 1F:
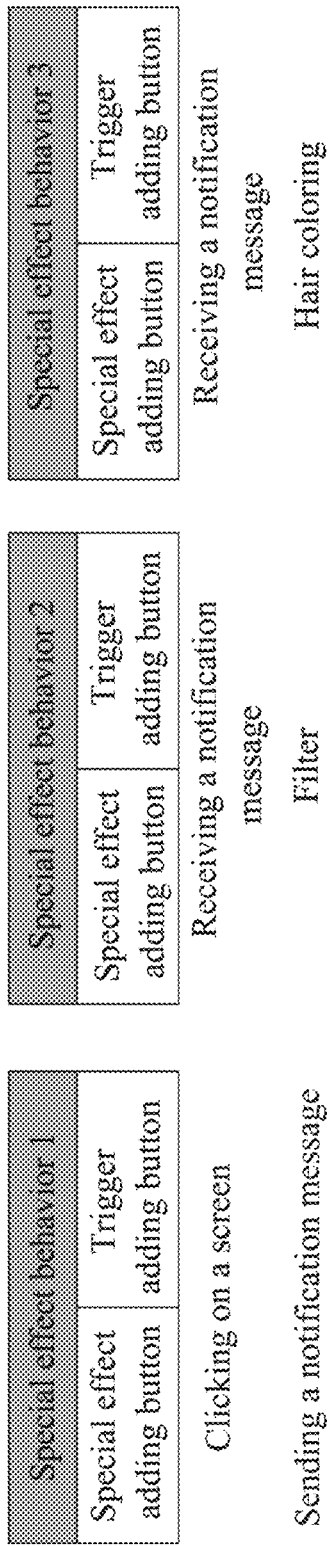
FIG. 1f is a schematic diagram of triggering multiple special effect behaviors in series in a special effect processing method according to an embodiment of the present disclosure.

As shown in FIG. 1f, when a plurality of special effect behaviors are in series, the triggering operation and the special effect in each special effect behavior are all independent of each other, that is, the triggering operation or the play of the special effect object in a special effect behavior 1 is not affected by that in a special effect behavior 2. However, in practical applications, an association between special effect behaviors is required, and the notification message is used to complete the association. As shown in FIG. 1f, a notification message is sent after clicking on the screen in the special effect behavior 1, and the notification message is received in both of the special effect behavior 2 and a special effect behavior 3, and filter and hair coloring effects will be played accordingly.

In an optional embodiment, step S14 specifically includes the following steps.

The first step: obtaining a play attribute of the special effect behavior in response to a setting operation of an attribute setting option on a setting window of a special effect behavior attribute.

Figure 1G:
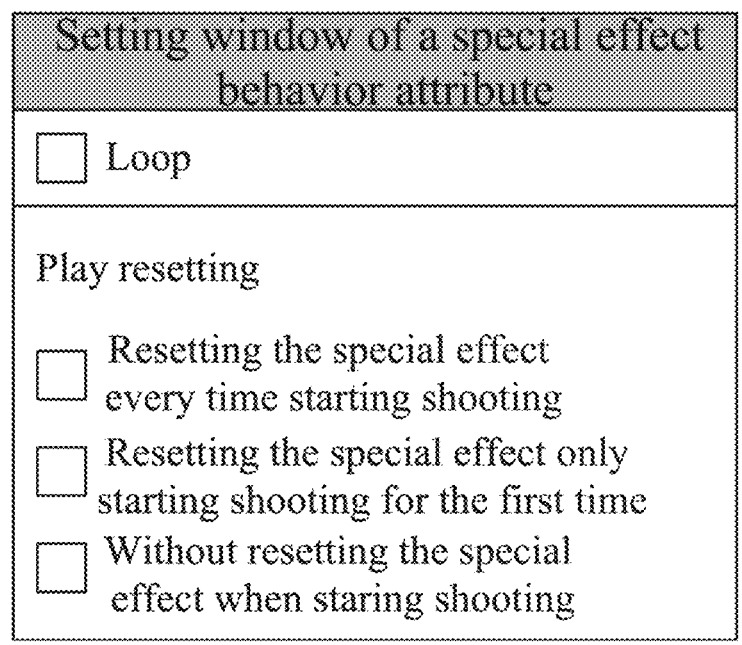
FIG. 1g is a schematic diagram of a setting window of a special effect behavior attribute in a special effect processing method according to an embodiment of the present disclosure.

As shown in FIG. 1g, it is an example of the setting window of the special effect behavior attribute, including a loop option and three options under a play reset, i.e., resetting the special effect every time starting shooting, resetting the special effect only starting shooting for the first time, without resetting the special effect when starting shooting. When a loop is selected, all the special effect objects and the triggering operations included in the special effect behavior will start to play again after the play is completed, and if the loop is not selected, the special effect objects and the triggering operations in the special effect behavior will not be capable of being played again after the play ends. When resetting the special effect every time starting shooting is selected, no matter which special effect object and triggering operation in the special effect behavior are played, the special effect behavior starts from the beginning after pressing a shooting button. When resetting the special effect only starting shooting for the first time is selected, after the shooting button is pressed at the first one, the special effect behavior is played from the beginning, and for the subsequent press of the shooting button, the special effect behavior may not be played again. When without resetting the special effect when staring shooting is selected, no matter how many times the shooting button is pressed, the special effect behavior will not be played again. Therefore, when a series of triggering operations and special effect objects are combined to support looping or shoot resetting, they may be accommodated in a single special effect behavior.

The second step: generating the special effect event according to the special effect behavior and the play attribute.

Those skilled in the art should understand that, obvious modifications (for example, superimposing listed modes) or equivalent replacements may also be made on the basis of the above embodiments.

Hereinbefore, although the steps in the embodiments of the special effect processing method has been described in the above order, it should be clear to those skilled in the art that the steps in the embodiments of the present disclosure are not necessarily performed in the above order, and it may also performed in other sequences such as being performed in a reverse order, in parallel and in cross, etc., and on the basis of the above steps, those skilled in the art may also add other steps, these obvious modifications or equivalent replacement should also be included within the protection scope of the present disclosure, which will not be repeated here.

The following are apparatus embodiments of the present disclosure, and the apparatus embodiments of the present disclosure may be used to perform the steps implemented by method embodiments of the present disclosure. For the convenience of description, only the parts relevant to the embodiments of the present disclosure are shown, and the specific technical details are not disclosed, please refer to the method embodiments of the present disclosure.

Embodiment 2

Figure 2:
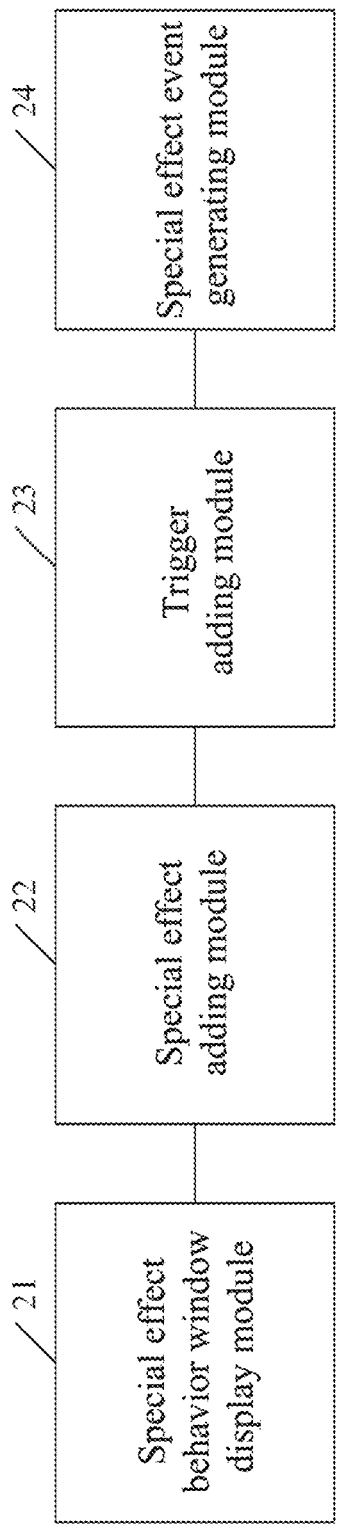
FIG. 2 is a schematic flowchart of a special effect processing apparatus according to an embodiment of the present disclosure.

In order to solve the technical problem of insufficient scalability of the special effect processing in the prior art, an embodiment of the present disclosure provides a special effect processing apparatus. The apparatus may perform the steps in the embodiments of the special effect processing method described in the above Embodiment 1. As shown in FIG. 2, the apparatus mainly includes a special effect behavior window display module 21, a special effect adding module 22, a trigger adding module 23 and a special effect event generating module 24; where the special effect behavior window display module 21 is configured to display a special effect behavior window in response to a special effect adding operation of a special effect configuration window; where the special effect behavior window includes a special effect adding button and a trigger adding button;

the special effect adding module 22 is configured to add at least one special effect object in the special effect behavior window in response to the special effect adding operation of the special effect adding button;

the trigger adding module 23 is configured to set at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window; and the special effect event generating module 24 is configured to generate a special effect event according to the special effect behavior.

Further, the trigger adding module 23 is specifically configured to: display a trigger type setting window in response to the triggering operation of the trigger adding button; obtain a selected trigger type in response to a selection operation of a trigger type option on the trigger type setting window; and add at least one triggering operation for the special effect behavior corresponding to the special effect behavior window in response to at least one trigger adding operation corresponding to the selected trigger type on the trigger adding button.

Further, the trigger adding module 23 is further configured to: set a triggering condition for the special effect behavior corresponding to the special effect behavior window in response to a setting operation of a trigger setting option on a trigger setting window; where the at least one triggering operation triggers the special effect behavior to be displayed when the triggering condition is satisfied.

Further, the trigger adding module 23 is specifically configured to: set delay time for the special effect behavior corresponding to the special effect behavior window in response to a setting operation of a delay setting option on a delay setting window, and take the delay time as the triggering condition.

Further, the trigger adding module 23 is specifically configured to: generate a notification message of the special effect behavior corresponding to the special effect behavior window in response to a setting operation of a notification setting option on a notification setting window and take the notification message as the triggering condition; where the notification message is used to notify display of the special effect behavior in other effect events in series with the special effect event.

Further, the special effect event generating module 24 is specifically configured to: obtain a play attribute of the special effect behavior in response to a setting operation of an attribute setting option on a setting window of a special effect behavior attribute; and generate the special effect event according to the special effect behavior and the play attribute.

For the detailed description related to a working principle and technical effects achieved, etc. of the embodiments of the special effect processing apparatus, reference may be made to the relevant description in the aforementioned embodiments of the special effect processing method, which will not be repeated here.

Embodiment 3

Figure 3:
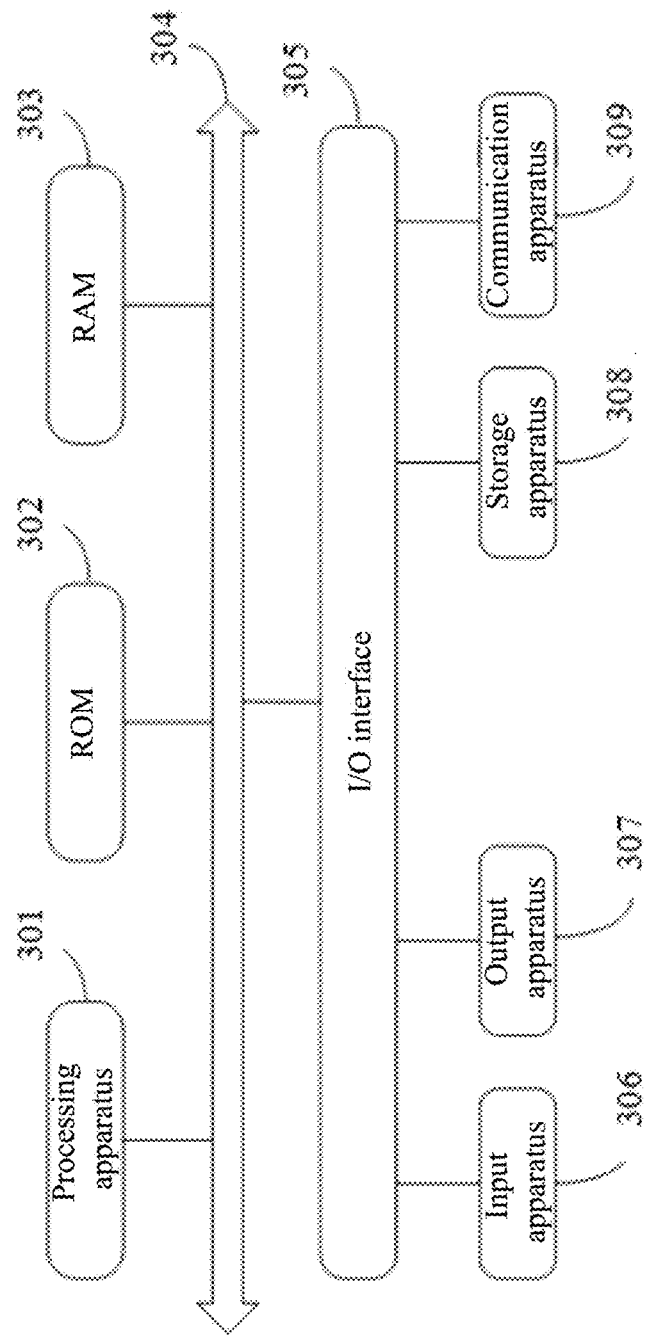
FIG. 3 is a schematic structural diagram of an electronic device according to an embodiment of the present disclosure.

Referring next to FIG. 3, it shows a schematic structural diagram of an electronic device 300 suitable for implementing the embodiments of the present disclosure. Terminal devices in the embodiments of the present disclosure may include, but not limited to, a mobile terminal such as a mobile phone, a notebook computer, a digital broadcast receiver, a PDA (Personal Digital Assistant), a PAD (Portable ANDROID™ Device), a PMP (Portable Multimedia Player), a vehicle terminal (e.g., vehicle navigation terminal), and the like, and a stationary terminal such as a digital TV (Digital Television), a desktop computer, and the like. The electronic device 300 shown in FIG. 3 is only an example, and should not impose any limitation on the function and the scope of use of the embodiments of the present disclosure.

As shown in FIG. 3, the electronic device 300 may include a processing apparatus (e.g., a central processor, a graphics processor, etc.) 301, which may perform various appropriate actions and processes according to a program stored in a read-only memory (ROM) 302 or a program loaded into a random access memory (RAM) 303 from a storage apparatus 308. In the RAM 303, various programs and data necessary for operations of the electronic device 300 are also stored. The processing apparatus 301, the ROM 302, and the RAM 303 are connected to each other through a bus 304. An input/output (I/O) interface 305 is also connected to the bus 304.

In general, the following apparatus may be connected to the I/O interface 305: an input apparatus 306 including, for example, a touch screen, a touch pad, a keyboard, a mouse, a camera, a microphone, an accelerometer, a gyroscope, etc.; an output apparatus 307 including, for example, a liquid crystal display (LCD), a speaker, a vibrator, etc.; the storage apparatus 308 including, for example, a magnetic tape, a hard disk, etc.; and a communication apparatus 309. The communication apparatus 309 may allow the electronic device 300 to communicate wirelessly or by wire with other devices to exchange data. While FIG. 3 shows the electronic device 300 having various apparatuses, it should be understood that not all of the illustrated apparatuses are required to be implemented or provided. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product including a computer program carried on a non-transitory computer readable medium, and the computer program contains program codes for performing the method illustrated in the flowcharts. In such embodiment, the computer program may be downloaded and installed from the network via the communication apparatus 309, or installed from the storage apparatus 308, or installed from the ROM 302. When the computer program is performed by the processing apparatus 301, the above functions defined in the methods of the embodiments of the present disclosure are performed.

It should be noted that the above computer readable medium of the present disclosure may be a computer readable signal medium or a computer readable storage medium or any superposition of the above two. The computer readable storage medium may be, for example, but not limited to, an electrical, a magnetic, an optical, an electromagnetic, an infrared, or a semiconductor system, apparatus or device, or a superposition of any of the above. More specific examples of the computer readable storage medium may include, but are not limited to, electrical connection with one or more wires, a portable computer disk, a hard disk, a random access memory (RAM), a read only memory (ROM), an erasable programmable read only memory (Erasable Programmable ROM, EPROM or Flash), a fiber optic, a portable compact disc read only memory (Compact Disc ROM, CD-ROM), an optical storage device, a magnetic storage device, or any suitable superposition of the above. In the present disclosure, a computer readable storage medium may be any tangible medium that contains or stores a program that may be used by or in conjunction with an instruction execution system, apparatus, or device. In the present disclosure, however, the computer readable signal medium may include a data signal propagated in a baseband or as a part of a carrier wave with a computer readable program code carried therein. This propagated data signal may take many forms, Including, but not limited to, an electromagnetic signal, an optical signal, or any suitable superposition of the foregoing. The computer readable signal medium may also be any computer readable medium other than the computer readable storage medium, where the computer readable signal medium may send, propagate, or transmit a program for use by or in connection with an instruction execution system, apparatus, or device. A program code included in the computer readable medium may be transmitted using any suitable medium including, but not limited to, an electrical wire, an optical cable, RF (Radio Frequency), etc., or any suitable superposition of the above.

In some implementations, a client and a server may use any currently known or future developed network protocol such as a HTTP (HyperText Transfer Protocol) for communication, and may interconnect with any form or medium of digital data communication (e.g., communication network). Examples of communication networks include a local area network ("LAN"), a wide area network ("WAN"), an internet (e.g., the Internet), and a peer-to-peer network (e.g., an ad hoc peer-to-peer network), and any currently known or future developed networks.

The above computer readable medium may be included in the above electronic device; and it may also exist alone without being assembled into the electronic device.

The above computer readable medium carries one or more programs, and the above one or more programs, when performed by the electronic device, enable the electronic device to: display a special effect behavior window in response to a special effect adding operation of a special effect configuration window; where the special effect behavior window includes a special effect adding button and a trigger adding button; add at least one special effect object in the special effect behavior window in response to the special effect adding operation of the special effect adding button; set at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window; and generate a special effect event according to the special effect behavior.

A computer program code for performing operations of the present disclosure may be written in one or more programming languages or a superposition thereof, the above programming languages include but not limited to object-oriented programming languages—such as JAVA™, SMALLTALK™, C++, and also include conventional procedural programming languages—such as the "C" language or similar programming languages. The program code may be performed entirely on the user's computer, partly on the user's computer, as a stand-alone software package, partly on the user's computer and partly on a remote computer, or entirely on the remote computer or the server. In cases involving the remote computer, the remote computer may be connected to the user's computer through any kind of network, including a local area network (LAN) or a wide area network (WAN), or may be connected to an external computer (e.g., connected using an Internet service provider via the Internet).

Flowcharts and block diagrams in the drawings illustrate system architectures, functions, and operations which may be implemented according to systems, methods and computer program products of various embodiments of the present disclosure. In this regard, each block in the flowcharts or the block diagrams may represent a module, a program segment, or a portion of code that contains one or more executable instructions for implementing the specified functions. It should also be noted that, in some alternative implementations, the functions noted in the blocks may occur in an order different from that noted in the drawings. For example, two blocks shown in a succession may, in fact, be performed substantially in parallel, or they may sometimes be performed in a reverse order, and this depends upon the function involved. It is also to be noted that each block in the block diagrams or the flowcharts, and the superposition of blocks in the blocks diagrams or the flowcharts, may be implemented in a dedicated hardware-based system that perform specified functions or operations, or may be implemented by the superposition of dedicated hardware and computer instructions.

The units involved in the embodiments of the present disclosure may be implemented in a software manner, and may also be implemented in a hardware manner. Where a name of the unit does not constitute a limitation of the unit itself under certain cases, for example, a first acquiring unit may also be described as "a unit that acquires at least two internet protocol addresses".

The functions described herein above may be performed, at least in part, by one or more hardware logic components. For example, without limitation, exemplary types of hardware logic components that may be used include: a field programmable gate array (FPGA), an application specific integrated circuit (ASIC), application specific standard parts (ASSP), a system on chip (SOC), a complex programming logic device (CPLD) and the like.

In the context of the present disclosure, a machine readable medium may be a tangible medium that may contain or store a program for use by or in connection with an instruction execution system, apparatus, or device. The machine readable medium may be a machine readable signal medium or a machine readable storage medium. The machine readable medium may include, but are not limited to, an electronic, a magnetic, an optical, an electromagnetic, an infrared, or a semiconductor system, apparatus or device, or any suitable superposition of the foregoing. More specific examples of the machine readable storage medium may include one or more wire-based electrical connections, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable superposition of the foregoing.

According to one or more embodiments of the present disclosure, a special effect processing method is provided, including:

displaying a special effect behavior window in response to a special effect adding operation of a special effect configuration window; where the special effect behavior window includes a special effect adding button and a trigger adding button;

adding at least one special effect object in the special effect behavior window in response to the special effect adding operation of the special effect adding button;

setting at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window; and generating a special effect event according to the special effect behavior.

Further, the setting the at least one triggering operation for the special effect behavior corresponding to the special effect behavior window in response to the trigger adding operation of the trigger adding button includes:

displaying a trigger type setting window in response to the triggering operation of the trigger adding button;

obtaining a selected trigger type in response to a selection operation of a trigger type option on a trigger type setting window; and adding at least one triggering operation for the special effect behavior corresponding to the special effect behavior window in response to at least one trigger adding operation corresponding to the selected trigger type on the trigger adding button.

Further, the method further includes:

setting a triggering condition for the special effect behavior corresponding to the special effect behavior window in response to a setting operation of a trigger setting option on a trigger setting window; where the at least one triggering operation triggers the special effect behavior to be displayed when the triggering condition is satisfied.

Further, the setting the triggering condition for the special effect behavior corresponding to the special effect behavior window in response to the setting operation of the trigger setting option on the trigger setting window includes:

setting delay time for the special effect behavior corresponding to the special effect behavior window in response to a setting operation of a delay setting option on a delay setting window, and taking the delay time as the triggering condition.

Further, the setting the triggering condition for the special effect behavior corresponding to the special effect behavior window in response to the setting operation of the trigger setting option on the trigger setting window includes:

generating a notification message of the special effect behavior corresponding to the special effect behavior window in response to a setting operation of a notification setting option on a notification setting window and taking the notification message as the triggering condition; where the notification message is used to notify display of special effect behavior in other effect events in series with the special effect event.

Further, the generating the special effect event according to the special effect behavior includes:

obtaining a play attribute of the special effect behavior in response to a setting operation of an attribute setting option on a setting window of a special effect behavior attribute; and generating the special effect event according to the special effect behavior and the play attribute.

According to one or more embodiments of the present disclosure, a special effect processing apparatus is provided, including:

a special effect behavior window display module, configured to display a special effect behavior window in response to a special effect adding operation of a special effect configuration window; where the special effect behavior window includes a special effect adding button and a trigger adding button;

a special effect adding module, configured to add at least one special effect object in the special effect behavior window in response to the special effect adding operation of the special effect adding button;

a trigger adding module, configured to set at least one triggering operation for a special effect behavior corresponding to the special effect behavior window in response to a trigger adding operation of the trigger adding button; where the at least one triggering operation is used to trigger the special effect behavior to be displayed, and the special effect behavior includes at least one special effect object added in the special effect behavior window; and a special effect event generating module, configured to generate a special effect event according to the special effect behavior.

Further, the trigger adding module is specifically configured to: display a trigger type setting window in response to the triggering operation of the trigger adding button; obtain a selected trigger type in response to a selection operation of a trigger type option on the trigger type setting window; and add at least one triggering operation for the special effect behavior corresponding to the special effect behavior window in response to at least one trigger adding operation corresponding to the selected trigger type on the trigger adding button.

Further, the trigger adding module is further configured to: set a triggering condition for the special effect behavior corresponding to the special effect behavior window in response to a setting operation of a trigger setting option on a trigger setting window; where the at least one triggering operation triggers the special effect behavior to be displayed when the triggering condition is satisfied.

Further, the trigger adding module is specifically configured to: set delay time for the special effect behavior corresponding to the special effect behavior window in response to a setting operation of a delay setting option on a delay setting window, and take the delay time as the triggering condition.

Further, the trigger adding module is specifically configured to: generate a notification message of the special effect behavior corresponding to the special effect behavior window in response to a setting operation of a notification setting option on a notification setting window and take the notification message as the triggering condition; where the notification message is used to notify the display of the special effect behavior in other effect events in series with the special effect event.

Further, the special effect event generating module is specifically configured to: obtain a play attribute of the special effect behavior in response to a setting operation of an attribute setting option on a setting window of a special effect behavior attribute; and generate the special effect event according to the special effect behavior and the play attribute.

According to one or more embodiments of the present disclosure, an electronic device is provided, including:

a memory, configured to store non-transitory computer readable instructions; and a processor, configured to run the computer readable instructions, so that the processor implements the above special effect processing method when performed.

According to one or more embodiments of the present disclosure, a computer readable storage medium is provided, where the computer readable storage medium is used to store non-transitory computer readable instructions which, when executed by a computer, enable a computer to perform the above special effect processing method.

According to one or more embodiments of the present disclosure, a computer program is provided, where the computer program, when running on a computer, enables the computer to perform the above special effect processing method.

According to one or more embodiments of the present disclosure, a computer program product is provided, including computer program instructions, where the computer program instructions enable a computer to perform the above special effect processing method.

The above description is only a preferred embodiment of the present disclosure and an illustration of the applied technical principles. Those skilled in the art should understand that the disclosure scope involved in the present disclosure is not limited to the technical solutions formed by the specific superposition of the above technical features, and should also cover other technical solutions formed by arbitrarily superposing the above technical features or its equivalent features without departing from the above disclosed concept, for example, a technical solution formed by replacing the above features with the technical features disclosed in the present disclosure (but not limited to) with similar functions.

Further, although operations are described in a particular order, this should not be understood as requiring that the operations be performed in the particular order shown or in a sequential order. Under certain circumstances, multitasking and parallel processing may be advantageous. Likewise, although the above discussion contains several specific implementation details, these should not be construed as limitations on the scope of the present disclosure. Certain features that are described in the context of a separate embodiment may also be implemented additively in a single embodiment. Rather, various features that are described in the context of a single embodiment may also be implemented in multiple embodiments separately or in any suitable sub-superposition.

Although the subject matter has been described in a language specific to structural features or methodological logical actions, it is to be understood that the subject matter defined in the appended claims is not necessarily limited to the specific features or actions described above. Rather, the specific features and actions described above are merely example forms for implementing the claims.

What is claimed is:

1. A special effect processing method, comprising:
    displaying a special effect behavior window in response to a special effect adding operation of a special effect configuration window; wherein the special effect behavior window comprises a special effect adding button and a trigger adding button;
    adding at least one special effect object in the special effect behavior window in response to the special effect adding operation of the special effect adding button;
    setting multiple triggering operations for a special effect behavior corresponding to the special effect behavior window in response to a trigger adding operation of the trigger adding button; wherein the multiple triggering operations are used to trigger the special effect behavior to be displayed, and the special effect behavior comprises at least one special effect object added in the special effect behavior window;
    generating a special effect event according to the special effect behavior; and
    wherein the method further comprises:
    setting a triggering condition for the special effect behavior corresponding to the special effect behavior window in response to a setting operation of a trigger setting option on a trigger setting window; wherein the multiple triggering operations trigger the special effect behavior to be displayed when the triggering condition is satisfied;
    wherein the setting the triggering condition for the special effect behavior corresponding to the special effect behavior window in response to the setting operation of the trigger setting option on the trigger setting window comprises:
    generating a notification message of the special effect behavior corresponding to the special effect behavior window in response to a setting operation of a notification setting option on a notification setting window and taking the notification message as the triggering condition; wherein the notification message is used to notify simultaneous display of a plurality of special effect behaviors in other effect events in series with the special effect event; and
    wherein the generating the special effect event according to the special effect behavior comprises:
    obtaining a play attribute of the special effect behavior in response to a setting operation of an attribute setting option on a setting window of a special effect behavior attribute; wherein the play attribute comprises at least one option of a loop option and three options under a play reset; and the three options under the play reset are resetting the special effect every time starting shooting, resetting the special effect only starting shooting for the first time, and without resetting the special effect when starting shooting; and
    generating the special effect event according to the special effect behavior and the play attribute.

2. The method according to claim 1, wherein the setting the multiple triggering operations for the special effect behavior corresponding to the special effect behavior window in response to the trigger adding operation of the trigger adding button comprises:
    displaying a trigger type setting window in response to a triggering operation of the trigger adding button;
    obtaining a selected trigger type in response to a selection operation of a trigger type option on the trigger type setting window; and
    adding the multiple triggering operations for the special effect behavior corresponding to the special effect behavior window in response to at least one trigger adding operation corresponding to the selected trigger type on the trigger adding button.

3. The method according to claim 1, wherein the setting the triggering condition for the special effect behavior corresponding to the special effect behavior window in response to the setting operation of the trigger setting option on the trigger setting window comprises:
    setting delay time for the special effect behavior corresponding to the special effect behavior window in response to a setting operation of a delay setting option on a delay setting window, and taking the delay time as the triggering condition.

4. A special effect processing apparatus, comprising:
    at least one processor; and
    a memory storing instructions and connected with the at least one processor;
    wherein the instructions, when executed by the at least one processor, cause the at least one processor to:
    display a special effect behavior window in response to a special effect adding operation of a special effect configuration window; wherein the special effect behavior window comprises a special effect adding button and a trigger adding button;

add at least one special effect object in the special effect behavior window in response to the special effect adding operation of the special effect adding button;

set multiple triggering operations for a special effect behavior corresponding to the special effect behavior window in response to a trigger adding operation of the trigger adding button; wherein the multiple triggering operations are used to trigger the special effect behavior to be displayed, and the special effect behavior comprises at least one special effect object added in the special effect behavior window;

generate a special effect event according to the special effect behavior; and wherein the instructions further cause the at least one processor to:

set a triggering condition for the special effect behavior corresponding to the special effect behavior window in response to a setting operation of a trigger setting option on a trigger setting window; wherein the multiple triggering operations trigger the special effect behavior to be displayed when the triggering condition is satisfied;

generate a notification message of the special effect behavior corresponding to the special effect behavior window in response to a setting operation of a notification setting option on a notification setting window and take the notification message as the triggering condition; wherein the notification message is used to notify simultaneous display of a plurality of special effect behaviors in other effect events in series with the special effect event;

obtain a play attribute of the special effect behavior in response to a setting operation of an attribute setting option on a setting window of a special effect behavior attribute; wherein the play attribute comprises at least one option of a loop option and three options under a play reset; and the three options under the play reset are resetting the special effect every time starting shooting, resetting the special effect only starting shooting for the first time, and without resetting the special effect when starting shooting; and generate the special effect event according to the special effect behavior and the play attribute.

5. The apparatus according to claim 4, wherein the instructions further cause the at least one processor to:

display a trigger type setting window in response to a triggering operation of the trigger adding button;

obtain a selected trigger type in response to a selection operation of a trigger type option on the trigger type setting window; and add the multiple triggering operations for the special effect behavior corresponding to the special effect behavior window in response to at least one trigger adding operation corresponding to the selected trigger type on the trigger adding button.

6. The apparatus according to claim 4, wherein the instructions further cause the at least one processor to:

set delay time for the special effect behavior corresponding to the special effect behavior window in response to a setting operation of a delay setting option on a delay setting window, and taking the delay time as the triggering condition.

7. A non-transitory computer readable storage medium used to store non-transitory computer readable instructions which, when executed by a computer, enable the computer to perform the following steps:

displaying a special effect behavior window in response to a special effect adding operation of a special effect configuration window; wherein the special effect behavior window comprises a special effect adding button and a trigger adding button;

adding at least one special effect object in the special effect behavior window in response to the special effect adding operation of the special effect adding button;

setting multiple triggering operations for a special effect behavior corresponding to the special effect behavior window in response to a trigger adding operation of the trigger adding button; wherein the multiple triggering operations are used to trigger the special effect behavior to be displayed, and the special effect behavior comprises the at least one special effect object added in the special effect behavior window;

generating a special effect event according to the special effect behavior; and wherein the steps further comprise:

setting a triggering condition for the special effect behavior corresponding to the special effect behavior window in response to a setting operation of a trigger setting option on a trigger setting window; wherein the multiple triggering operations trigger the special effect behavior to be displayed when the triggering condition is satisfied, wherein the setting the triggering condition for the special effect behavior corresponding to the special effect behavior window in response to the setting operation of the trigger setting option on the trigger setting window comprises:

generating a notification message of the special effect behavior corresponding to the special effect behavior window in response to a setting operation of a notification setting option on a notification setting window and taking the notification message as the triggering condition; wherein the notification message is used to notify simultaneous display of a plurality of special effect behaviors in other effect events in series with the special effect event; and wherein the generating the special effect event according to the special effect behavior comprises:

obtaining a play attribute of the special effect behavior in response to a setting operation of an attribute setting option on a setting window of a special effect behavior attribute; wherein the play attribute comprises at least one option of a loop option and three options under a play reset; and the three options under the play reset are resetting the special effect every time starting shooting, resetting the special effect only starting shooting for the first time, and without resetting the special effect when starting shooting; and generating the special effect event according to the special effect behavior and the play attribute.

8. The non-transitory computer readable storage medium according to claim 7, wherein the setting the multiple triggering operations for the special effect behavior corresponding to the special effect behavior window in response to the trigger adding operation of the trigger adding button comprises:

displaying a trigger type setting window in response to a triggering operation of the trigger adding button;

obtaining a selected trigger type in response to a selection operation of a trigger type option on the trigger type setting window; and adding the multiple triggering operations for the special effect behavior corresponding to the special effect behavior window in response to at least one trigger adding operation corresponding to the selected trigger type on the trigger adding button.

9. The non-transitory computer readable storage medium according to claim 7, wherein the setting the triggering condition for the special effect behavior corresponding to the special effect behavior window in response to the setting operation of the trigger setting option on the trigger setting window comprises:

setting delay time for the special effect behavior corresponding to the special effect behavior window in response to a setting operation of a delay setting option on a delay setting window, and taking the delay time as the triggering condition.

* * * * *